Fig-2

Nov. 10, 1964     G. P. DEYERLING ETAL     3,156,321
HYDRAULIC ACTUATOR AND WHEEL MOUNTING FOR DISC TYPE BRAKE
Original Filed Feb. 18, 1957     6 Sheets-Sheet 3

Fig. 3

INVENTORS
GERARD P. DEYERLING
MACK O. LINDLEY
BY
William T. Thompson
ATTORNEY

Nov. 10, 1964  G. P. DEYERLING ET AL  3,156,321
HYDRAULIC ACTUATOR AND WHEEL MOUNTING FOR DISC TYPE BRAKE
Original Filed Feb. 18, 1957  6 Sheets-Sheet 4

Fig. 4

INVENTORS
GERARD P. DEYERLING
MACK O. LINDLEY
BY-
William J. Thompson
ATTORNEY

INVENTORS
GERARD P. DEYERLING
MACK O. LINDLEY
BY
William ~~~~~~
ATTORNEY

United States Patent Office 3,156,321
Patented Nov. 10, 1964

3,156,321
HYDRAULIC ACTUATOR AND WHEEL MOUNTING FOR DISC TYPE BRAKE
Gerard P. Deyerling and Mack O. Lindley, South Bend, Ind., assignors to The Bendix Corporation, South Bend, Ind., a corporation of Delaware
Continuation of application Ser. No. 640,941, Feb. 18, 1957. This application Jan. 18, 1963, Ser. No. 252,483
10 Claims. (Cl. 188—18)

This invention relates to a hydraulic actuator and wheel mounting for a disc type brake which is adaptable for use in an aircraft wheel and brake combination as a part of the aircraft undercarriage. The present application is a continuation of our application Serial No. 640,941, filed February 18, 1957, and now abandoned.

One of the requirements of a wheel and brake construction is that the brake be containable within the confines of the wheel and still be of sufficiently large capacity so that the ground speed of the aircraft can be effectively controlled. Because of space considerations which are omnipresent in aircraft design, it is usually the practice to locate the brake entirely within the confines of the wheel; thus, the wheel construction and wheel mounting construction influence to a large extent the operation and construction of the brake.

It is generally true in the aircraft wheel and brake art that as large a capacity brake as possible is fitted within the smallest volumetric confines of a wheel, in order to obtain an acceptably functional brake and yet conserve valuable space within the retraction wells of the aircraft undercarriage.

Obviously, there is a point where these two factors of space versus capacity must be compromised so that any construction change which permits an increase in brake capacity at no greater wheel size will be seen to be a very significant advance in the art.

Another space conserving measure is to locate the wheel as closely as possible to the depending strut with the limitation being a sufficient gap which will provide running clearance between the tire and adjacent mounting structure. It is nonessential to make the running clearance of a magnitude necessary to safeguard against deflections of the tire and strut, tending to cause their engagement. Previously, there was required sufficient running clearance which would provide for wheel and strut deflections because these deflections had the effect of reducing the tire-strut clearance, or perhaps even equalling the clearance, in which case there is objectionable wearing damage to the tire and strut.

It is an object of the invention to provide a mounting strut between the rotating means (such as wheel or tire), and the nonrotative supportive structure (such as the strut) which will cause these two members to deflect in unison so that regardless of ground load they are not brought into rubbing contact. Thus there may be a very small order of clearance distances between the wheel (or tire) and strut, and the mounting feature described will insure the adequacy of this clearance even though wheel deflections, strut deflections, etc. will occur. It will be seen that this object is achieved by means of bolting the strut directly to a wheel supportive side, such as a cone or disc, which is nonrotative and is located at one side of the wheel.

We have in large part achieved our object of efficiently using available wheel space for the brake, by means of providing an actuator (hydraulic or mechanical) which is located coincidentally with the axis of rotation of the wheel. By this means we have eliminated the conventional carrier plate, which can either result in a space saving, or additional brake elements may be added to make a larger capacity brake in the same wheel volume.

It is a further proposal of the present invention to reduce the complexity of manufacturing and servicing the wheel and brake which is usually involved with brake carrier constructions having multiple pistons, or annular pistons.

A desirable feature of the invention is that the fluid motor is locatable in a cool region of the wheel so that less of the kinetic energy which is converted to heat by the brake is transmitted to the fluid motor to produce hydraulic fluid vaporization.

A further beneficial feature of the present invention is that more even brake applying pressure is exerted around the circumference of the braking members than is usually obtainable with a plurality of spaced individual pistons or the usual annular piston arrangement. Because a single flat circular disc piston is used to apply the brake, it is possible to obtain a maximum piston area for a given space with the result that there is both a weight saving and space saving in obtaining an actuator of a given applying force.

Other objects and features of the invention will become apparent from a consideration of the following description which proceeds with reference to the accompanying drawings wherein a plurality of embodiments of the invention are described by way of example.

Figure 1:
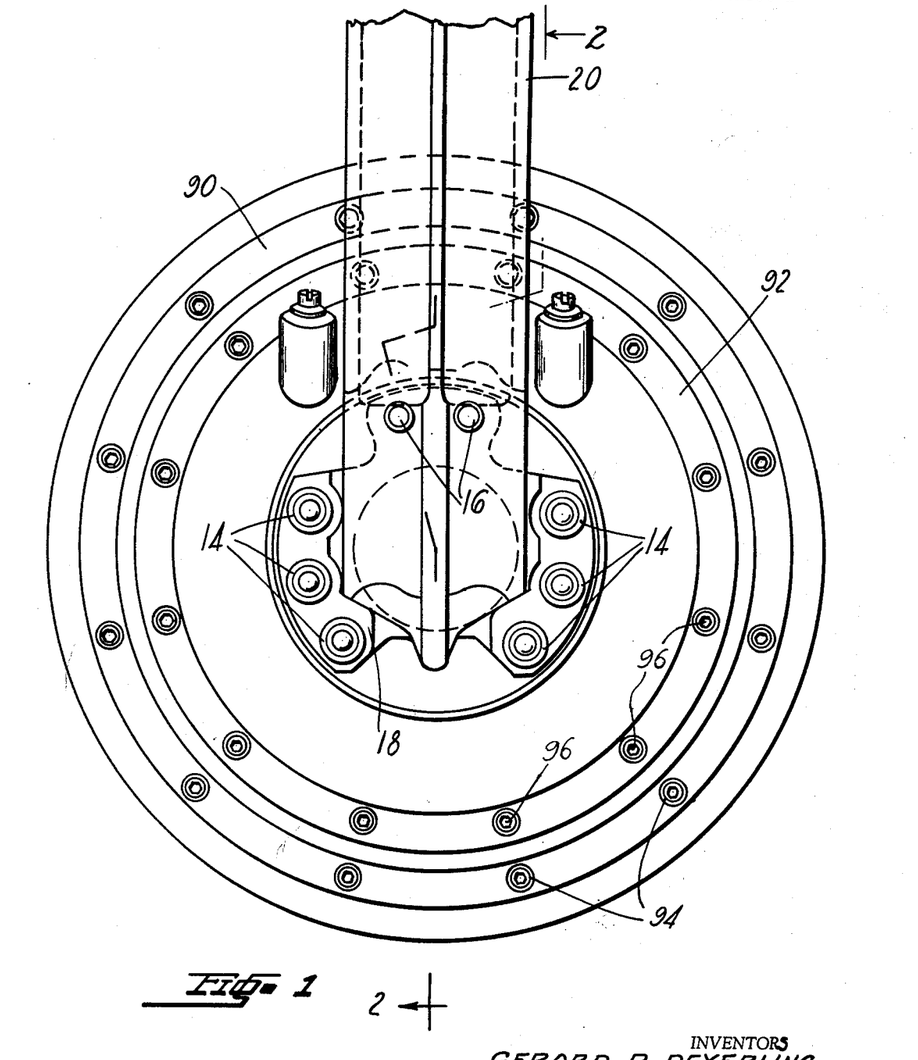
FIGURE 1 is a side elevation of a wheel mounted directly at the end of the fork of a shock strut without the usual transverse axle.
Figure 2:
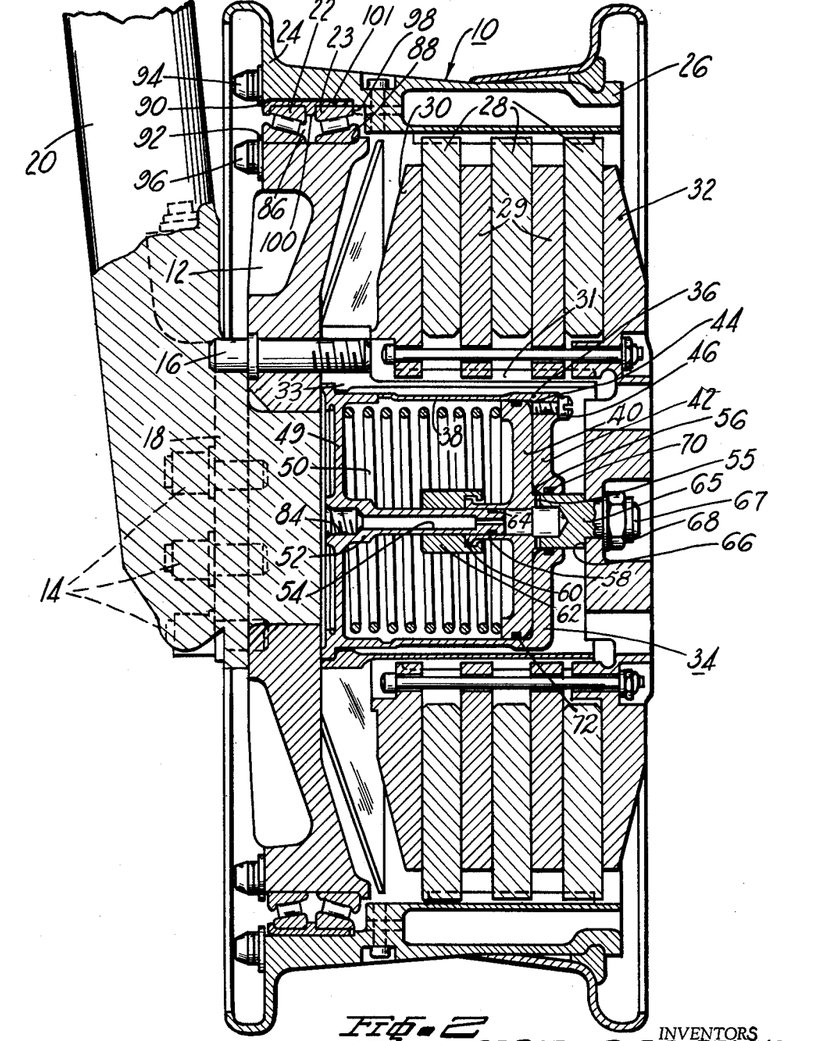
FIGURE 2 is an axial section view of FIGURE 1 taken substantially on line 2—2 of FIGURE 1.

Referring to the first embodiment of the invention which is shown in FIGURES 1 and 2, it will be noted that the aircraft wheel 10 is supported on a single nonrotatable wheel supporting side 12 which is fastened by means of bolts 14 and dowel pins 16 to a flange 18 that is located at the termination of the fork 20 of an aircraft undercarriage.

Generally, the wheel is supported on a stub axle instead of being tied directly to the fork 20. It has been found, however, that ground loads tend to twist the wheel in such a direction that the tire is caused to rub against the fork of the shock strut, and this can be remedied by either increasing the clearance with a space loss in the tire retraction well (not shown), or the supporting side can be tied directly to the fork of the aircraft undercarriage without the load being transmitted through a stub axle. With the arrangement shown only a very slight clearance is required. The twisting tendency of the wheel is resisted effectively by the large diameter bearing. There is provided in this instance, a double row of oppositely tapered roller bearings 22, 23 which are supported at the outer circumference of wheel supporting side 12 and directly engage the undersurface of rim 24 of the wheel 10. With the illustrated mounting the wheel and strut will deflect in unison so that deflection does not reduce the wheel-strut clearance; thus, the clearance can be very slight and this clearance is relatively unaffected by deflections under normal ground engagement loads.

With the described wheel mounting structure, the entire volume surrounded by the rim 24 of the wheel between the side 12 and the opposite edge of the rim 24 is available to be occupied by braking elements. Obviously, because a greater volume is made available for braking elements, it is possible to provide a higher capacity brake within a given wheel size by virtue of this increase in efficiency of utilization of the space provided.

Spaced around the circumference of the rim 24 are a number of rotor drive keys 26 to which are splined a number of rotors 28 which are axially movable and are limited in their axial movement by means of a fixed reaction or backing plate 30. Between adjacent rotors there are stator plates 29 which are splined to a torque-taking sleeve 31 having a flanged portion 33 which is bolted to the side 12 by means of threaded dowel pins 16 as indicated in FIGURE 2.

The interleaved rotors 28 and stators 29 are forcibly engaged by an axial movable pressure plate 32 which clamps the rotors and stators against the backing plate 30.

Where the mounting stub axle of the aircraft was previously located, there is now provided a hydraulic actuating mechanism 34 which comprises a cylinder 36 having a cylinder bore 38 and a piston 40 slidably received in said cylinder bore 38. The one end of cylinder 36 is closed by an integral partition 42 having a bleeder port 44 and bleeder screw 46, and the other end of the cylinder 36 is closed by end closure 49 which compresses helical springs 50 against the piston 40.

End closure 49 has a stem 52 which extends in an axial direction and is provided with a hydraulic passage 54 terminating in radial bores 55 which lead to expanding chamber 56 wherein fluid pressure is admitted to force the piston 40 toward the left and thereby apply the brake.

The piston 40 has projections which extend on either side thereof—the projection 58 is slidably fitted over the end of stem 52, and the end thereof is provided with a boss 60 in combination with an automatic adjustor 62. Seal 64 prevents leakage of fluid between stem 52 and projection 58.

The other projection 65 of the piston 40 has the radial bores 55. Projection 65 is stepped to form a shoulder 66 in engagement with the pressure plate 32. The end 67 of the projection is threaded and receives a nut 68 which fixes the projection 65 to the pressure plate 32 so that as the piston 40 is caused to move toward the left, the pressure plate 32 is also drawn in a like direction thereby. An O ring seal 70 is located between the projection 65 and end 42 so that the expansible chamber 56 is sealed.

The usual O ring seal 72 is provided in the piston to seal the expansible chamber 56 against leakage between piston 40 and cylinder bore 38.

To actuate the fluid motor there is provided a fluid pressure source (not shown) which is suitably joined with the hydraulic actuating mechanism via the usual passages, ports, etc. which can be supplied in the specific manner indicated by the particular design brake. The fluid conducting means connects with the threaded port 84 in end closure 49; this port 84 being the inlet port of passage 54 in stem 52. Fluid pressure which is communicated via port 84 is transmitted through passages 54, 55; fluid pressure is then admitted to the expanding chamber 56 whereupon the piston 40 is displaced toward the left.

The double row of tapered roller bearings 22, 23 is positioned on a bearing seat 86 having a shoulder 88 which prevents the roller bearing 23 from moving toward the right. There are two circular rings 90 and 92 which are fastened to the rim 24 and side 12, respectively, by a series of circularly spaced threaded studs 94 and 96. A shoulder 98 of the wheel bears against the outer cup of bearing 23 as shown in FIGURE 2 and, since there is a spacer 100 provided between the two bearings, the wheel is prevented from axial movement toward the strut since side load is transmitted through the shoulder 98 and then between the two bearings 22, 23, and thence to ring 92 at the lower inboard corner of the bearing 22. The wheel is prevented from moving axially away from the strut since the ring 90 bears against the upper inboard shoulder of the bearing retainer cage 101; thrust is transmitted between the bearings and is caused ultimately to bear against the shoulder 88 of supporting side 12 through the inner cup of bearing 23.

One of the advantages of the present invention is that the wheel 10 can be disassembled from the strut without disturbing the brake. All that is necessary is to unscrew the studs 94, remove the ring 90 and the wheel is caused to slide on the bearing retainer cage 101 and thus moves away from the supporting side 12, leaving the bearings 22, 23 in position on the supporting side 12 and the brake members thus remain undisturbed and intact. In this way, the wheel can be serviced without costly disassembly procedures for the brake. Landing conditions and braking conditions reach the point where the useful life of the tire is usually shorter than that of the brake, and thus because removal of the wheel is more frequently required than servicing of the brake, there is a considerable advantage to this arrangement.

Figure 3:
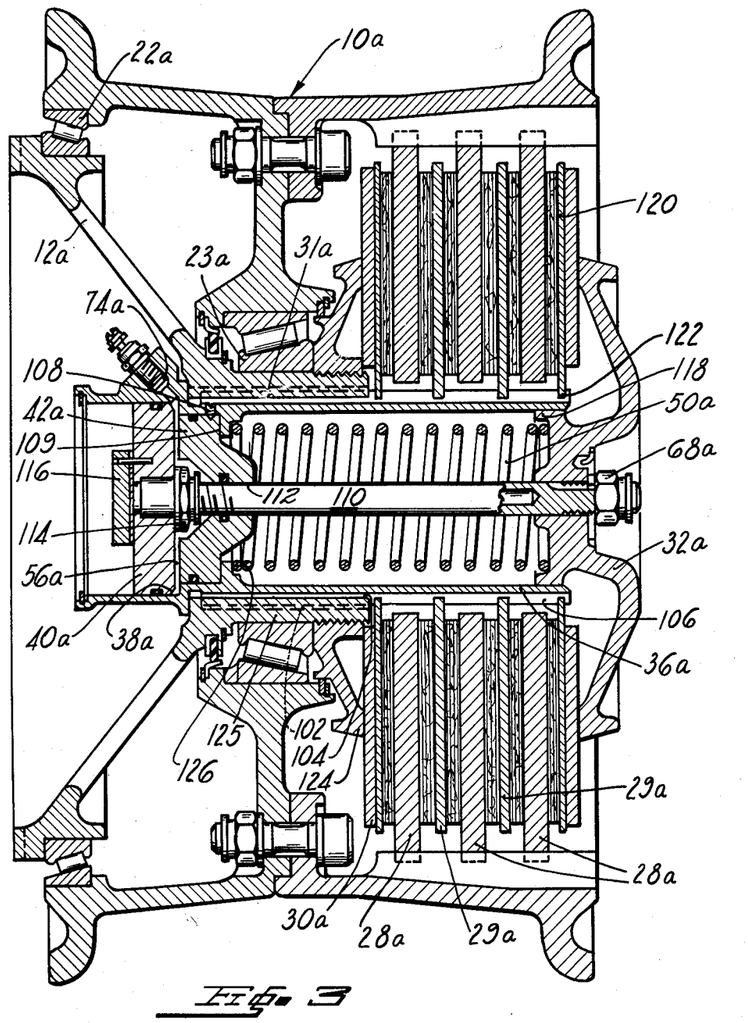
FIGURES 3 and 4 are axial section views of further embodiments of the actuator principles of the invention.

Referring next to th embodiment in FIGURE 3, parts of the brake corresponding to those previously described will be referred to with the same reference numeral but include further the subscript "a." The wheel 10a is carried on a depending portion of the strut (not shown) by means of a conical support member 12a. At one end of the cone there is a large diameter bearing 22a, which is adjacent the strut, and at the midportion of the wheel is a second bearing 23a which is of smaller diameter but is larger in all other dimensions than bearing 22a. Vertical loads on the wheel are transmitted through the conical member 12a and thence through the strut to the aircraft.

The conical member 12a has an integrally formed sleeve 31a which is formed with an opening 102 having splines 104 extending along the length of opening 102. A cylinder 36a having keys 106 is fitted within the keyways or splines 104 of sleeve 31a.

Within the cylinder 36a is a cylinder bore 38a which slidably receives a piston 40a. A fluid chamber 56a is formed between axially fixed partition 42a and piston 40a. A set screw 108 is used to hold the partition 42a against shoulder 109.

A pull rod 110 is passed through an opening 112 in partition 42a and is secured by means of nut 114 to the piston 40a which clamps the piston against nonrotatable head 116. The pull rod 110 is secured at the other end to pressure plate 32a by means of the threaded end which receives nut 68a. The pressure plate 32a has a circular portion 118 which is piloted within the cylinder 36a as indicated in FIGURE 3 in order to guide the axial movement of pressure plate 32a.

The pressure plate 32a includes also an annular portion 120 which is splined at 122 to the keyways formed in the outer periphery of cylinder 36a, thus preventing rotation of the pressure plate 32a but permitting axial sliding movement thereof to clamp the interleaved rotors 28a and stators 29a against backing member 30a.

It will be noted that the backing member 30a is supported vertically by means of an inclined buttressing member 124 which is threadedly received on a threaded collar 125 which is an extension of conical member 12a. The inclined or dished buttressing member is screwed onto the collar. The buttressing member 124 has the furthest function of imposing a selected tensile force on conical member 12a. Buttressing member 124 bears against bearing 23a which forces the wheel 10a toward the left, thus pushing laterally on bearing 22a which in turn bears against the large diameter end of conical member 12a. By thus imposing a load on the collar 125 and the periphery of the large diameter end of the cone 12a, the conical member 12a has a selected amount of tensile force imposed thereon which is best calculated to provide support for the wheel 10a.

The brake is held in a normally released position during absence of hydraulic actuating pressure by means of a spring 50a which is compressed between shoulder 126 and pressure plate 32a. The spring 50a urges the pressure plate 32a toward the right, thus releasing engagement of the pressure plate and the adjacent rotor. The remaining rotors and stators are free to disengage themselves with each other because of the unrestricted relative slidable movement permitted therebetween.

To adjust for the normal wear of the rotors and stators, the nut 68a is turned down to force the pressure plate 32a toward the left and thereby bring the stack of rotors and stators closer together.

In operation, fluid pressure is introduced through inlet port 74a and hydraulic fluid is thereby admitted to the chamber 56a forcing the piston 40a toward the left. As the piston moves toward the left, this motion of the piston transmits laterally biasing effort on the pressure plate 32a by virtue of their interconnection through pull rod 110. As the pressure plate 32a moves leftwardly, the rotors and stators are compressed together and are thrust against the backing member 30a. While the piston is being moved on its applying stroke, the spring 50a is compressed further so that when the hydraulic pressure is relieved in chamber 56a, the spring 50a will cause the pressure plate 32a to move toward the right until the piston 40a bottoms on the partition 42a. As mentioned previously, if successive brake applications have caused excessive wear of the rotors and stators, the brake may be manually adjusted by turning down the nut 68a to reduce the clearance between the rotors and stators by an acceptable amount.

Figure 4:
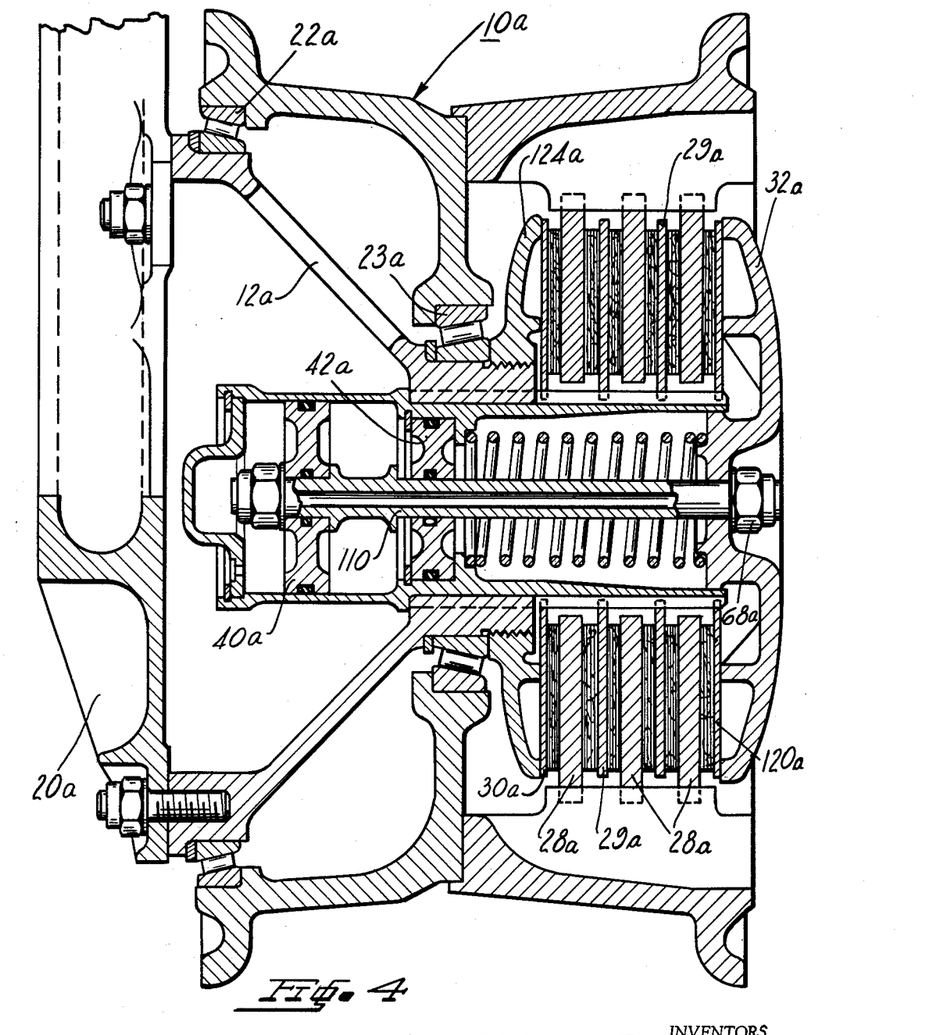

Referring next to FIGURE 4, it will be seen that a wheel 10a, brake and actuator system, substantially the same as shown in FIGURE 3, are mounted on the vertical shock strut fork 20a without the usual stub axle arrangement. As mentioned previously, the stub axle arrangement for supporting a wheel is unsatisfactory because of the high order of bending loads which cause the wheel to bend toward the fork of the strut, thus bringing about objectionable rubbing contact between either the tire or the rim of the wheel with the strut. To solve this, applicants introduced the feature of eliminating the stub axle and mounting the vertical fork directly to the wheel supporting side with either a conical member as indicated in FIGURES 3 and 4 or a single flat supporting member with a double row of tapered roller bearings. With the conical member shown in FIGURES 3 and 4, the problem of distorting the wheel by bending it toward the strut has been corrected to a large extent since the conical member is by nature more resistant to bending. Also, the combination of large bearing and small bearing at opposite ends of the conical member assists in preventing bending of the wheel from its vertical position. Unfortunately, the conical member reduces the available area for braking members, and bearing in mind the previous admonition that brakes must not cause a wheel volume increase, the design created a problem in regard to sufficient available space for an adequate brake.

The present invention is a solution to this problem insofar as in a given space, an adequate brake can be provided since the carrier plate is eliminated and this previously required member can now be occupied by additional braking elements such as an additional rotor or stator. The result is that even though the wheel has been reduced in regard to the space available for the brake, yet by the change in the actuator system, an adequate brake can be fitted into the smaller space while retaining the advantages of a wheel stabilized against twisting out of its vertical attitude under the weight of the aircraft.

Figure 5:
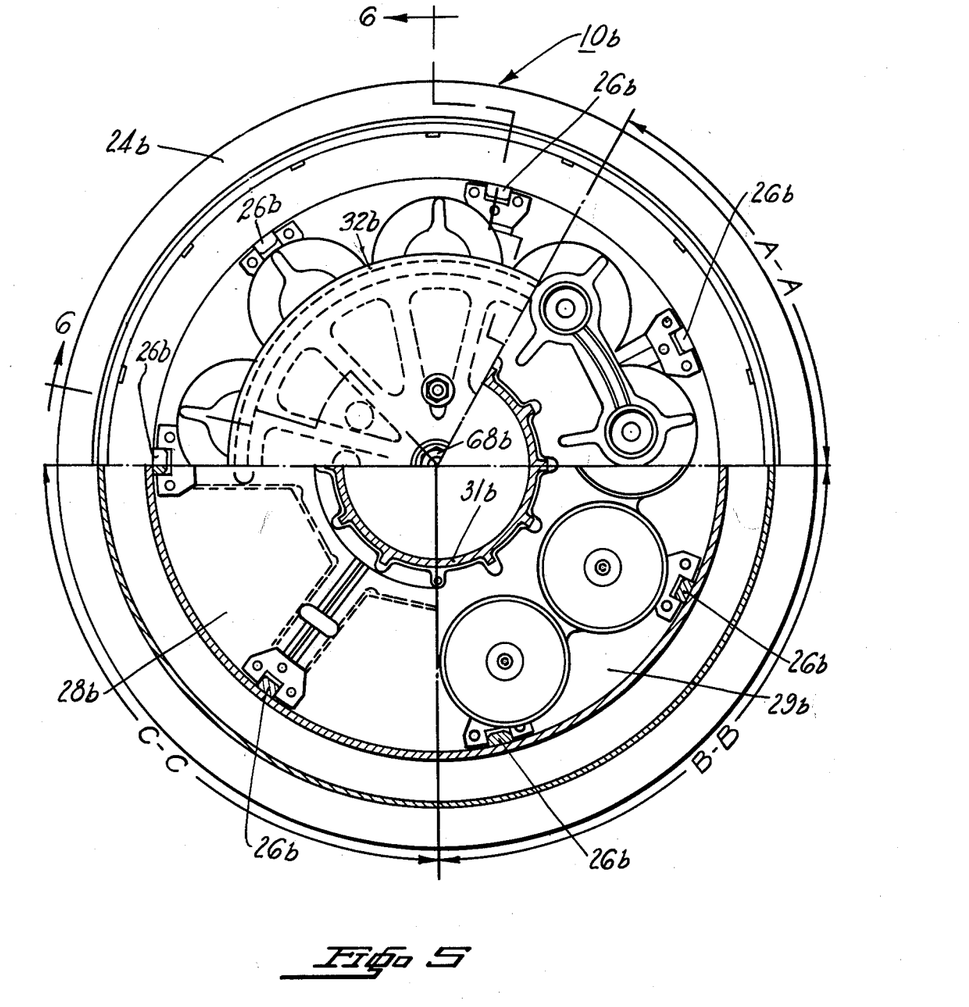
FIGURE 5 is a composite side elevation view of a further wheel and brake embodiment with sectors A—A, B—B, and C—C taken at the indicated levels of FIGURE 6.
Figure 6:
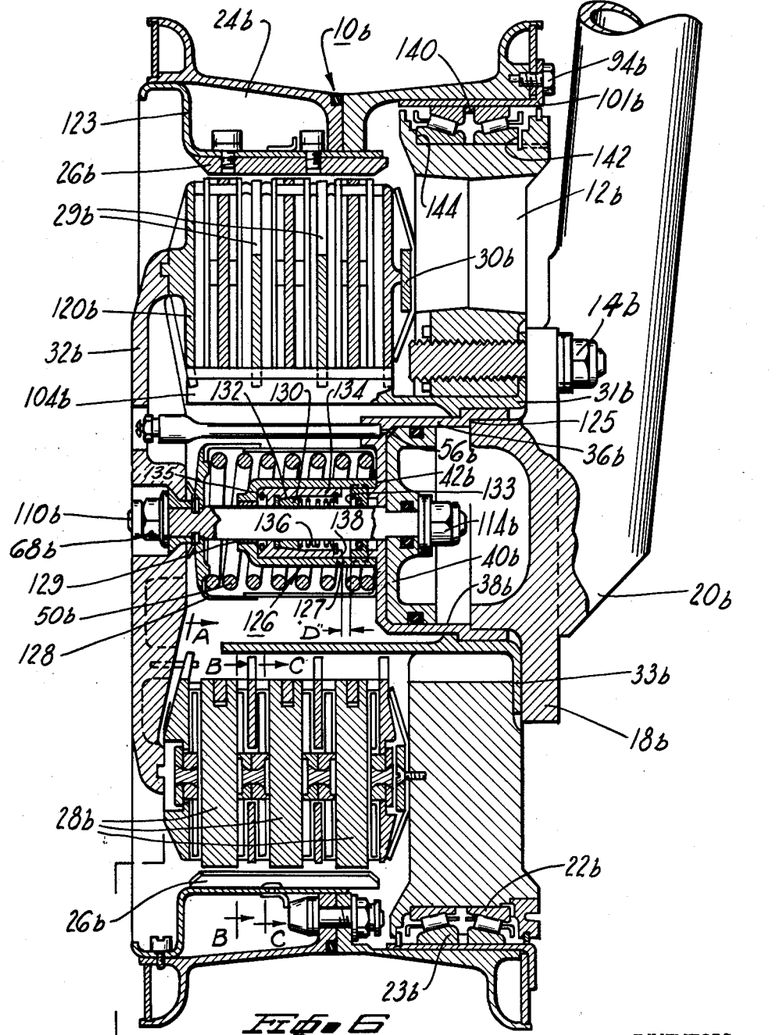
FIGURE 6 is an axial section view of FIGURE 5 taken on line 6—6 of FIGURE 5.

Referring next to the embodiment shown in FIGURES 5 and 6, parts of the assembly corresponding to those previously described will receive the same reference numeral but include further the subscript "b."

The wheel 10b is held vertically on a support member 12b having two oppositely tapered roller bearing assemblies 22b and 23b. Support member 12b is fastened to a flange 18b which is constructed at the end of the depending fork 20b constituting part of an aircraft undercarriage shock strut. Means for fastening the support member 12b to the flange 18b may be the usual studs, bolts, or the like, 14b. Sleeve member 31b has a flange portion 33b which permits it to be mounted jointly with the supporting member 12b by means of the bolts or studs 14b.

The purpose of sleeve member 31b is to provide splines 104b which permit the stators 29b to be axially slidable but prevent rotative movement thereof. At the undersurface of rim 24b of the wheel 10b are a plurality of circumferentially spaced keys 26b, to which are keyed for rotative movement, a plurality of rotors 28b.

A circular drum 123 surrounds the brake and provides a dead air space between the brake and the rim 24b of the wheel 10b, this dead air space serving as a protective thermal barrier which prevents heat damage to the tire. The drum also serves to pilot the two wheel halves as well as transmitting torque from the brake to the wheels via keys 26b.

To apply the brake, there is provided an actuator comprising a cylinder 36b having a cylinder bore 38b which is interlocked with the sleeve 31b at the stepped segment 125. The cylinder 36b is laterally fixed and is permanently positioned coaxially with the center of rotation of the wheel 10b. The pressure plate 32b is used to clamp the axially movable rotors 28b and stators 29b against the backing plate or reaction member 30b just as in the previous embodiments. The annular member 120b which is carried by the pressure plate 32b is also splined to the sleeve 31b along with the stators 29b to prevent rotation thereof, and also to pilot the member in its lateral movement during application and retraction of the brake.

A pull rod 110b is threaded at opposite ends to receive nuts 68b and 114b which serve to tie the pull rod 110b to the piston 40b and pressure plate 32b, respectively.

Also mounted on the pull rod 110b is an automatic adjustor, designated generally by reference numeral 126, and a telescopic baffle 128 which shields the automatic adjustor 126 and the return spring 50b from dirt and heat. The actuator is motivated by fluid pressure which opens into expansible chamber 56b to admit hydraulic fluid, or pneumatic pressure. The incoming fluid causes a displacement of the piston 40b toward the right and this movement produces a similar displacement of the pressure plate 32b toward the right since the two are connected rigidly together by means of the pull rod 110b. This displacement of the pressure plate 32b is against the resistance of the return spring 50b which is compressed by movement of the pressure plate 32b in an applying direction. As the pressure plate 32b moves toward the right, it clamps the whole stack of interleaved rotors and stators against the reaction plate 30b to develop forcible rubbing contact between the rotors and stators thus retarding rotation of the wheel 10b.

As the rotors and stators undergo normal wear (which is incidental to their use), then the automatic adjustor 126 will function to displace the piston 40b farther to the right and thus move the pressure plate 32b closer to the backing member 30b. Reducing the axial distance between the pressure plate 32b and the backing member 30b will maintain the desired clearance between the interleaved rotors and stators even though normal wear has produced a reduction in thickness of these members.

The automatic adjustor 126 comprises a tubular member 127 which is fixed to the transverse partition 42b of cylinder 36b and is held thereby in permanent securement. At the other end of the tubular member 127 there is a bushing 129 which is slidably fitted over the outer periphery of pull rod 110b. Within the tubular member 127 there is mounted a wedge shaped bushing 130 which is engageable with a tapered seat 132 of the fitting 134.

The bushing 130 is wedged into the tapered seat 132 by spring 136 which bears against the friction bushing 130 to keep it lodged against the tapered seat 132, thereby developing friction between the bushing 130 and the outer surface of the pull rod 110b.

The automatic adjustor 126 will serve to maintain clearance of the brake equalling the distance between the shoulder 133 and the end 138 of the fitting. This is a distance equalling "D" as indicated in FIGURE 6.

In operation, fluid pressure is conducted to chamber 56b where fluid is admitted to cause the piston 40b to move toward the right. Movement of the piston 40b toward the right will draw the pressure plate 32b in a like direction since the piston 40b and pressure plate 32b are interconnected through pull rod 110b. As the piston 40b moves toward the right, the fitting 134 and bushing 130 will move with the pull rod 110b until the end 138 of the fitting engages shoulder 133 and thereafter the pull rod 110b will move relatively to both the fitting 134 and the bushing 130. It will be noted that movement of the piston 40b in an applying direction (toward the right) will cause a compression of spring 50b which is located within the baffle 128. When the fluid pressure is released, the spring 50b will bias the pressure plate 32b toward the left, thus causing the pull rod 110b to move in a like direction. Movement of the pressure plate 32b in a leftward direction is limited by the automatic adjustor 126 by virtue of the fact that fitting 134 will re-engage the shoulder 135 at the turned over end of sleeve 128 and further movement of the pull rod 110b is prevented since the tapered bushing 130 is wedged against seat 132 and thereafter grips the outer periphery of the pull rod 110b with sufficient frictional force to prevent further leftward movement of the pull rod 110b.

Regardless of the extent of rightward movement of the pressure plate 32b, the retractile movement thereof is limited to the clearance represented by the distance "D" with the result that running clearance between the rotors and stators is maintained constant even though these members have worn during brake application.

It is thus seen that a hydraulic actuator can be located coincidentally with the axis of rotation of the wheel and that such a brake actuator can be provided with an automatic adjustor which will compensate for wear of the brake members.

Another important feature of the invention is that the wheel can be disassembled from the strut without disturbing the brake structure. The wheel is removed from bearing retainer 101b by unscrewing the machine screws 94b without disturbing the brake members. Between the two bearings there is a continuous flange 140. The bearings 22b and 23b are held in pockets 142 and 144, respectively.

The wheel is constrained from movement in either lateral direction without carrying the cage therewith. The cage retainer 101b, however, is prevented from moving in either direction by contact of the circular ridge 140 with either of the bearings 22b, 23b which are constrained by bearing pockets 142 and 144. It is thus seen that the wheel is prevented from moving in either lateral direction.

When it is desired to remove the wheel, the machine screws 94b are removed and the rim is free to slide away from the fork 20b since the undersurface of the rim 24b can slide over the outer cylindrical surface of the retainer ring 101b. In this manner the aircraft wheel can be serviced by removing the wheel and rim as an assembly without disturbing the brake members. This is a valuable feature of the invention inasmuch as the aircraft tire will ordinarily require servicing, replacement, etc. more often than the brake. Since it increases the cost and time of servicing to manipulate the brake parts, it is of advantage to remove the wheel without having to manipulate the brake.

It will be seen from a consideration of the various selected embodiments of the invention that an actuator may be made available at the axis or center location of the brake rather than providing an annular carrier plate and that the space previously occupied by the carrier member can now be utilized for additional brake rotors and stators. The net result of this is that within a given space, a larger capacity brake may be provided, or if it is desired, an equal capacity brake can be obtained in a smaller volume. The actuator can also be a mechanical linkage located at the axis of the brake, and the hydraulic actuator in turn may be located remotely from the wheel (for example, in the strut) and connected to the linkage through suitable levers, bell cranks or the like.

A further desirable advantage which is demonstrable from the examples is that the fluid motor actuator is located at a cooler zone in the brake with the result that the brake is less susceptible to failure because of vaporization of hydraulic fluid. A not immediately apparent advantage of the invention is that greater applying effort can be exerted for a given brake size because the piston is a circular, disc shaped piston, which provides a maximum area for the volume, and thus hydraulic pressure, which is supplied to the brake, being effective over a larger area gives a greater applying force than was previously obtained with either an annular ring-like piston, or a series of smaller disc shaped pistons which were circumferentially spaced around the circumference of the carrier. The hydraulic system is also easier to service and maintain generally, simply because there is a single piston as compared to a multiple piston arrangement.

Although the invention has been described in connection with but a limited number of example embodiments, it will be apparent to those skilled in the art that numerous deviations and modifications of the invention are possible without departing from the spirit and scope of the invention. It is our intention to include these variations and deviations from the invention, which incorporate the disclosed principles, within the scope of the following claims.

We claim:

1. A wheel and brake comprising a nonrotatable wheel supportive member extending radially into supportive engagement with the rim of the wheel, a nonrotatable cylindrical member located at the axis of rotation of the wheel within the confines of the wheel sides, a plurality of interleaved rotors and stators located within the confines of the wheel sides and keyed for axial movement to the rotatable wheel and cylindrical member respectively, a piston slidably received in a cylinder bore formed in said cylinder member, a pull rod operatively secured to said piston and displaceable therewith, a transverse pressure plate operatively secured to the pull rod and movable thereby to clamp the rotors and stators together in forcible engagement, and resilient means for urging the pressure plate in a retractile direction, and automatically adjusting means which positions the pressure plate responsively to wear of the rotors and stators to maintain approximately the initial clearance established between said rotors and stators.

2. In a wheel and brake assembly, a substantially flat wheel supportive member which defines one side of the wheel and which is the sole vertical support for the wheel, said wheel supportive member extending radially outward into engagement with the rim of the wheel, a pair of antifriction bearings between said supportive member and the wheel rim to mount the wheel for rotative movement and prevent twisting thereof, and an actuator for the wheel and brake comprising a cylinder mounted at the wheel axis of rotation and substantially coincident therewith, a piston slidably received in a cylinder bore formed in said cylinder, a plurality of axially movable interleaved annular rotors and stators located between the wheel sides and surrounding said actuator, a pressure plate at one side of the stack of rotors and stators, a fixed reaction plate at the other side of said rotors and stators, and a pull rod operatively secured between said piston and pressure plate so that fluid pressure admitted to said cylinder will act through the piston and pull rod to provide a clamping of the rotors and stators between said pressure plate and reaction plate.

3. A wheel and brake comprising a nonrotatable wheel supportive member extending radially into supportive engagement with the rim of the wheel, a nonrotatable cylindrical member secured to said wheel supportive member and extending therefrom along the axis of rotation of the wheel within the confines of the wheel sides, a plurality of interleaved rotors and stators located within the confines of the wheel sides and keyed for axial movement to the rotatable wheel and cylindrical member respectively, a piston slidably received in a cylinder bore formed in said cylinder member, a pull rod operatively secured to said piston and displaceable therewith, a transverse pressure plate operatively secured to the pull rod and movable thereby to clamp the rotors and stators together in forcible engagement, and resilient means for urging the pressure plate in a retractile direction.

4. In a wheel and brake assembly comprising a substantially flat wheel supportive member which is located at one side of the wheel and which define the sole vertical support for the wheel, a wheel rim, said wheel supportive member extending substantially radially outward into engagement with said rim, bearing means located between said supportive member and said rim to mount said rim for rotative movement, a cylinder mounted substantially at the axis of rotation of said wheel, a piston slidably received in said cylinder, a plurality of axially movable interleaved rotors and stators located between the wheel sides and surrounding said cylinder, a pressure plate at one side of the stack of rotors and stators, a fixed reaction plate at the other side of said rotors and stators, means interconnecting said piston and said pressure plate, and fluid pressure supplying means for supplying an actuating fluid pressure within said cylinder acting on said piston member to induce movement thereof and contactive engagement of said rotors and said stators.

5. A wheel and brake assembly comprising a nonrotatable wheel web for mounting the assembly, a wheel rim rotatably mounted on said wheel web and having a portion extending axially away from the web to an open side remote from the web, a disc-like braking member mounted inside said axially extending portion of the wheel rim for rotation with said wheel rim, a sleeve member fastened to said wheel web and projecting through said annular rotatable braking member and having an open end directed away from said web, a nonrotatable disc-like braking member mounted on the outside of said sleeve member and overlapping said rotatable braking member, a fluid actuated brake motor disposed inside said open end of said sleeve member and carried by said sleeve, said motor including a member movable in response to fluid pressure, and a spider disposed at the open side of said wheel rim having a central region at said open end of said sleeve connected to said movable motor member and having outer regions projecting beyond said sleeve end and engageable with one of said braking members to press it into engagement with the other braking member when said motor is actuated.

6. A wheel and brake assembly comprising a nonrotatable wheel web adapted for rigid mounting against a stub axle end, a wheel rim having outwardly directed tire bead engaging flanges at the circumferential marginal edges thereof, the wheel rim being rotatably engaged with said web at a location adjacent one of said tire flanges and disposed so that the rim extends away from an axle to which the web is mounted to an open side remote from the web, a set of annular braking members mounted within the envelope of said wheel rim and for rotation with said wheel rim, a hollow sleeve fastened to said wheel web and extending through said braking members to an open end directed away from said web, a set of nonrotatable brake members supported on the outside of said sleeve within the envelope of said wheel rim adjacent said rotatable brake members, a fluid actuated brake motor disposed within said open end of said sleeve and carried by said sleeve, said motor including a movable member adapted for axial displacement relative to said sleeve in response to fluid pressure to actuate the brake, and a spider at the open side of the rim extending from said open end of said sleeve to a location adjoining said brake members, and means exposed at said open side of the rim removably connecting said spider to said movable brake motor member, whereby the spider is effective to urge said brake members into braking engagement with each other in response to the actuation of said motor.

7. In a wheel and brake assembly comprising a substantially flat wheel supportive member which is located at one side of the wheel and which defines the sole vertical support for the wheel, a wheel rim, said wheel supportive member extending radially outwardly into engagement with said rim, bearing means located between said supportive member and said rim to mount said rim for rotative movement, a cylinder mounted substantially at the axis of rotation of said wheel, a single brake actuating piston assembly concentrically mounted about the axis of rotation of said wheel, a plurality of axially movable interleaved rotors and stators located between the wheel sides and surrounding said cylinder, a pressure plate at one side of the stack of rotors and stators, a fixed reaction plate at the other side of said rotors and stators, means interconnecting said actuating piston and said pressure plate, and fluid pressure supplying means for supplying an actuating fluid pressure to said piston assembly to induce movement thereof and contactive engagement of said rotors and said stators.

8. In a wheel and brake assembly comprising a single substantially flat annular wheel supportive member defining the sole vertical support for the wheel, a pair of large diameter tapered roller bearing assemblies concentrically mounted on the outer periphery of said annular wheel supportive member in side-by-side relation, a wheel rim member supportively mounted on said roller bearing assemblies adjacent one edge thereof enabling said rim to move rotatively relative to said annular wheel supportive member, said wheel rim having a nonsupported edge extending away from said annular wheel supportive member to define a brake cavity within said rim on one side of said wheel supportive member, a cylindrical sleeve member secured at one end to said wheel supportive member and extending into said brake cavity substantially along the axis of rotation of said wheel, a plurality of axially movable interleaved annular rotors and stators located in said brake cavity surrounding said cylindrical sleeve member, rotor drive keys secured to said wheel rim and engageable with said annular rotors to drive said rotors rotationally while permitting axial displacement thereof, said cylindrical sleeve having a splined surface engageable with said annular stators to maintain said stators rotationally fixed while permitting axial displacement thereof, a fixed reaction plate, a movable pressure plate, said reaction plate and said movable pressure plate disposed on opposed sides of said interleaved rotors and stators, an actuating piston connected to said movable pressure plate and operative to axially compress said rotors and stators into braking engagement.

9. A wheel and brake assembly as claimed in claim 8 wherein said actuating piston is concentrically disposed about the wheel axial centerline.

10. A wheel and brake assembly as claimed in claim 8 including a strut member with a flange formed on its lower end, means rigidly securing said flange to said wheel supportive member to form a rigid relatively non-bending connection between said wheel and strut.

No references cited.